Nov. 21, 1967    L. J. DOWD    3,353,750
SELF-PROPELLED IRRIGATION SYSTEM OF
THE RECIPROCABLE CABLE TYPE
Filed Oct. 15, 1965    7 Sheets-Sheet 5

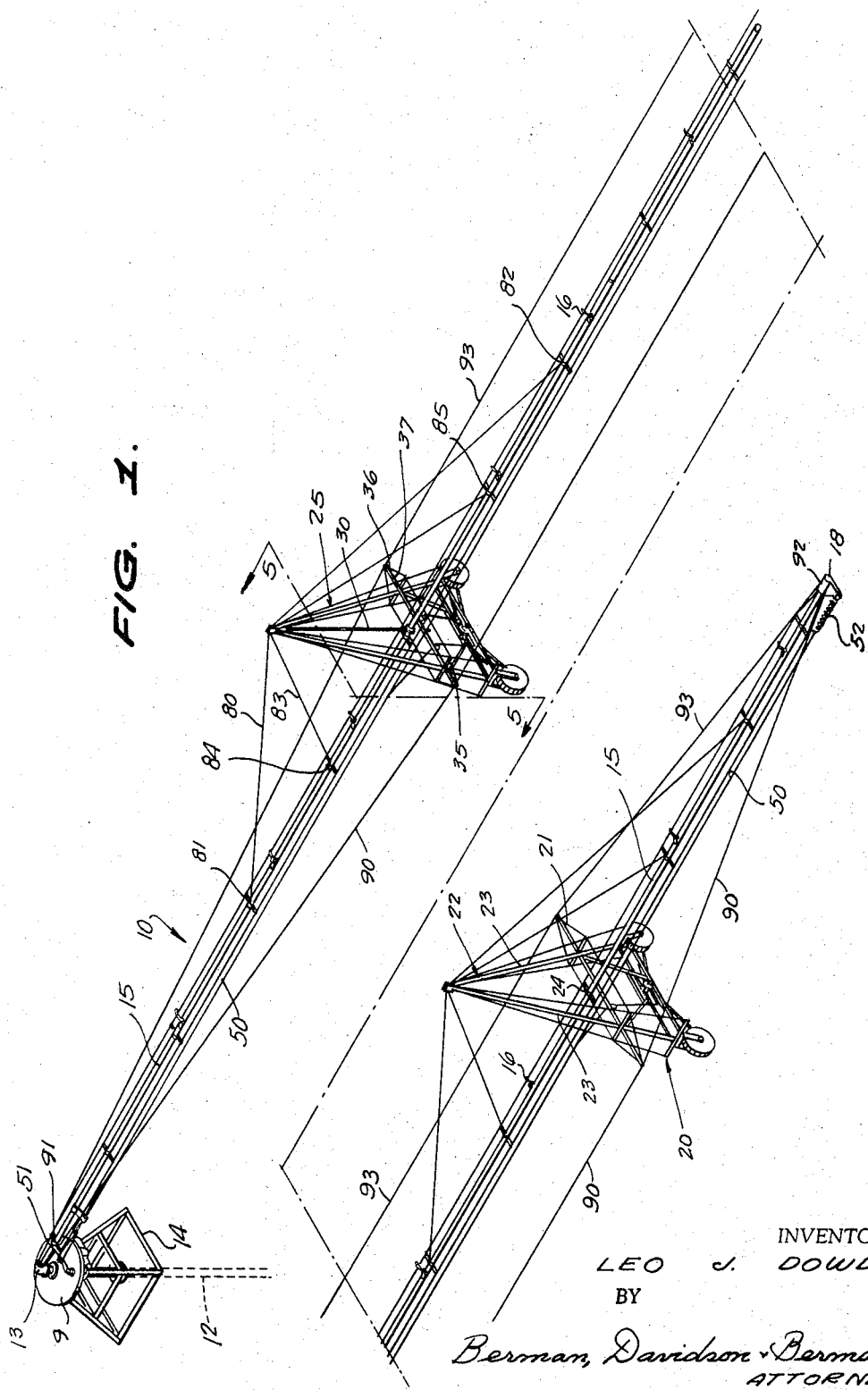

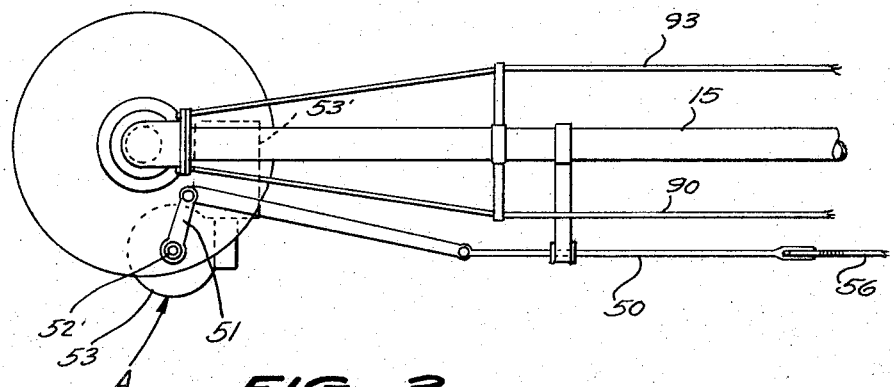
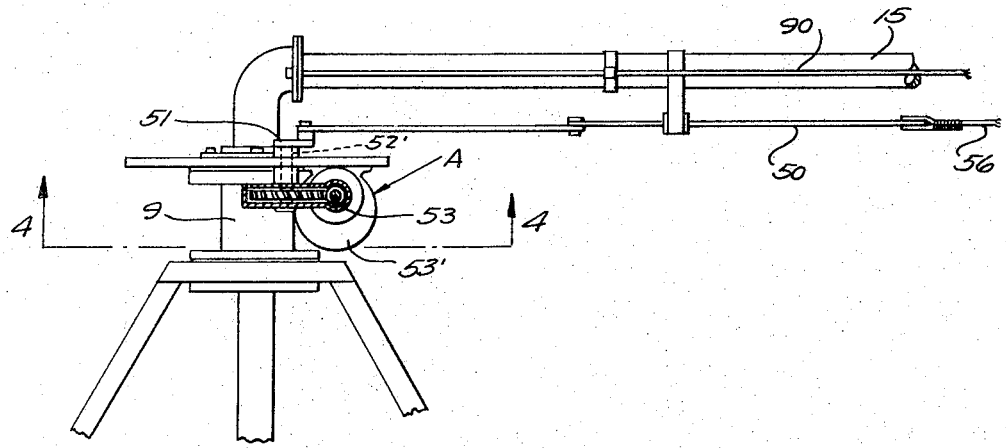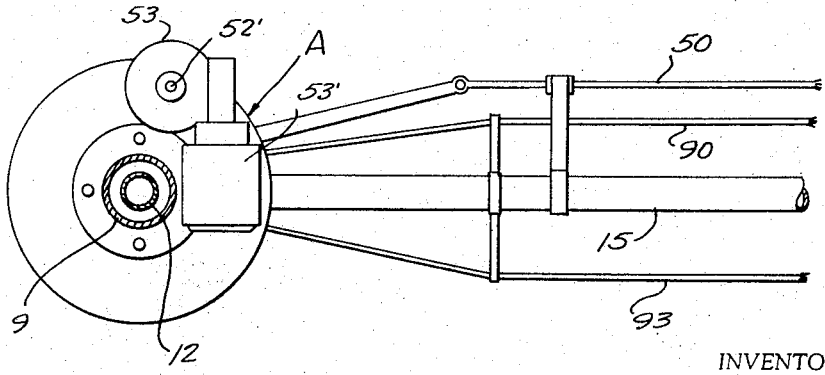

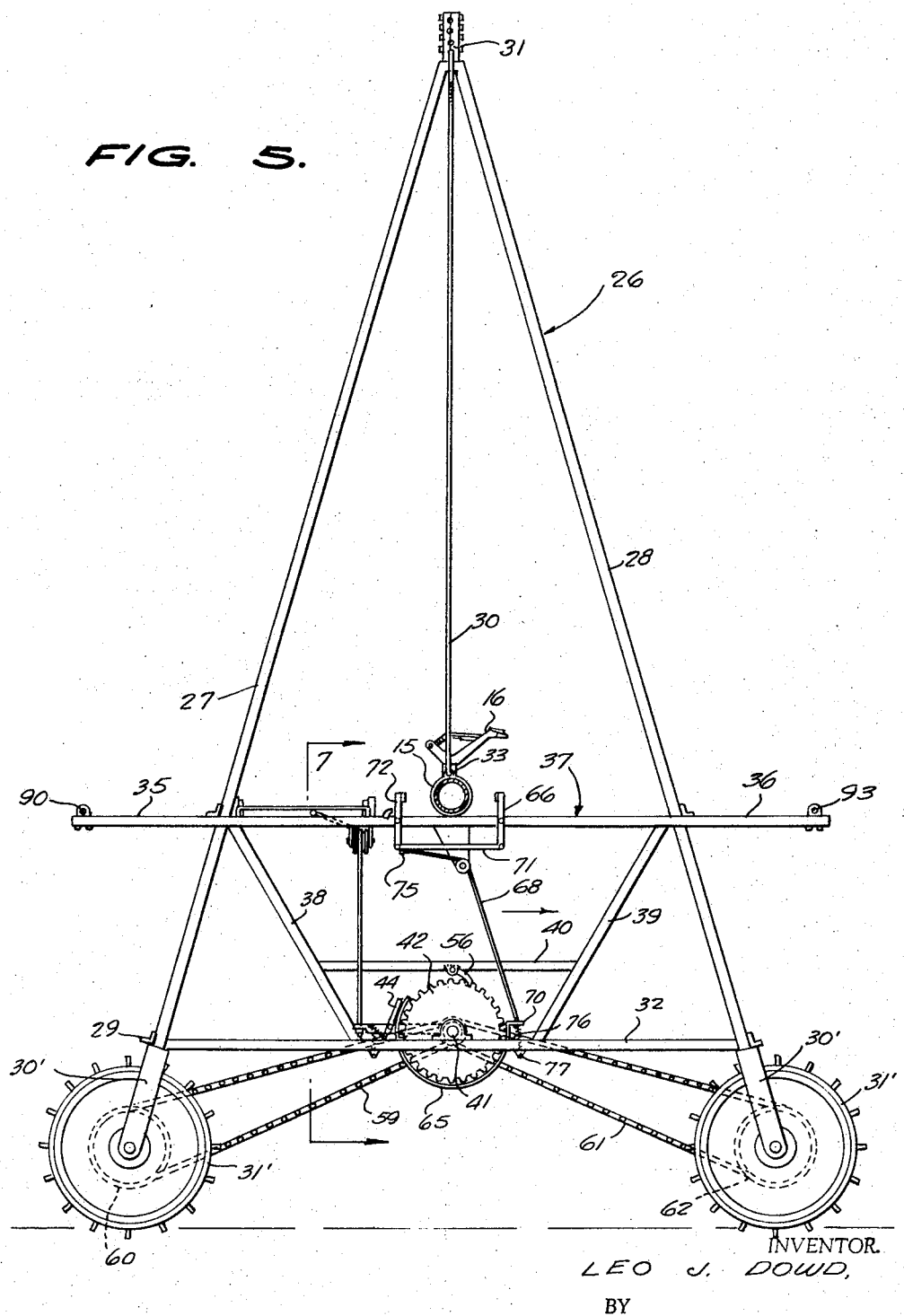

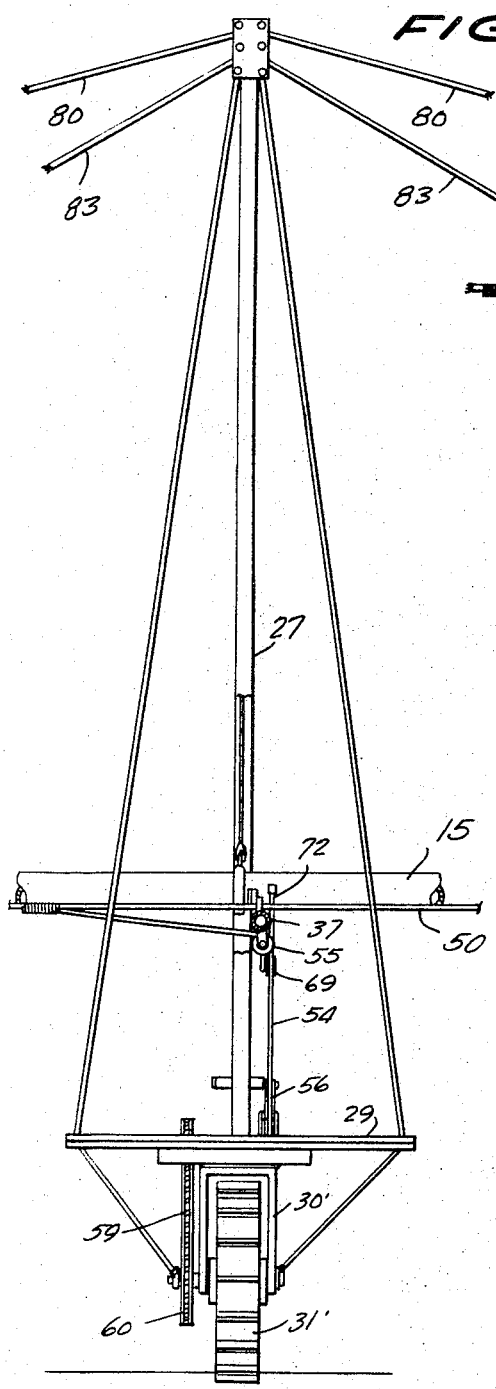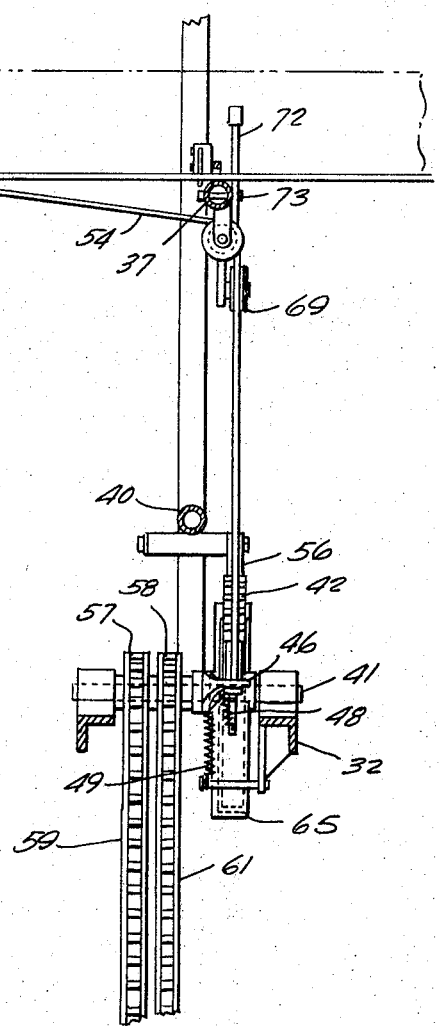

INVENTOR.
LEO J. DOWD,
BY
Berman, Davidson & Berman
ATTORNEYS.

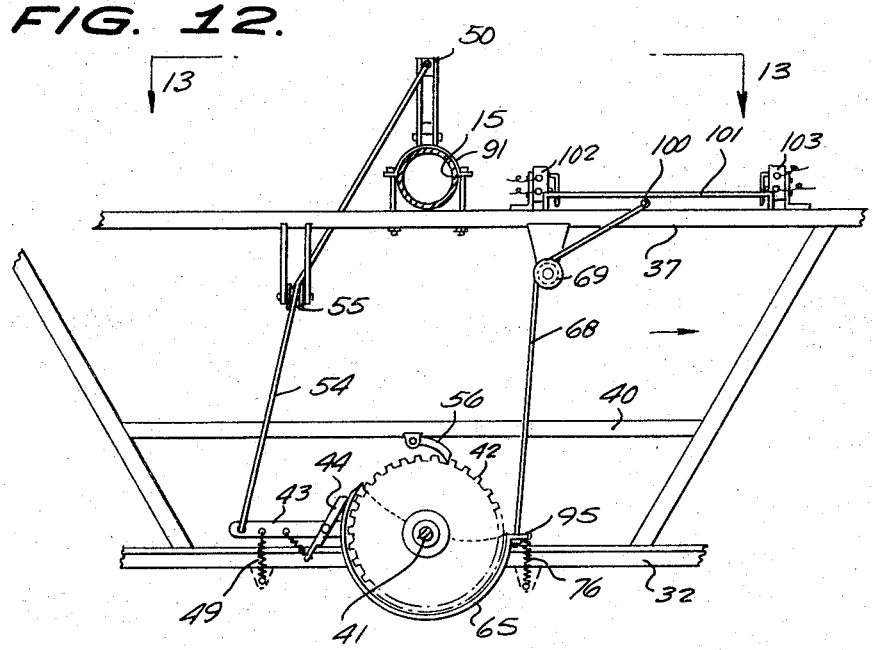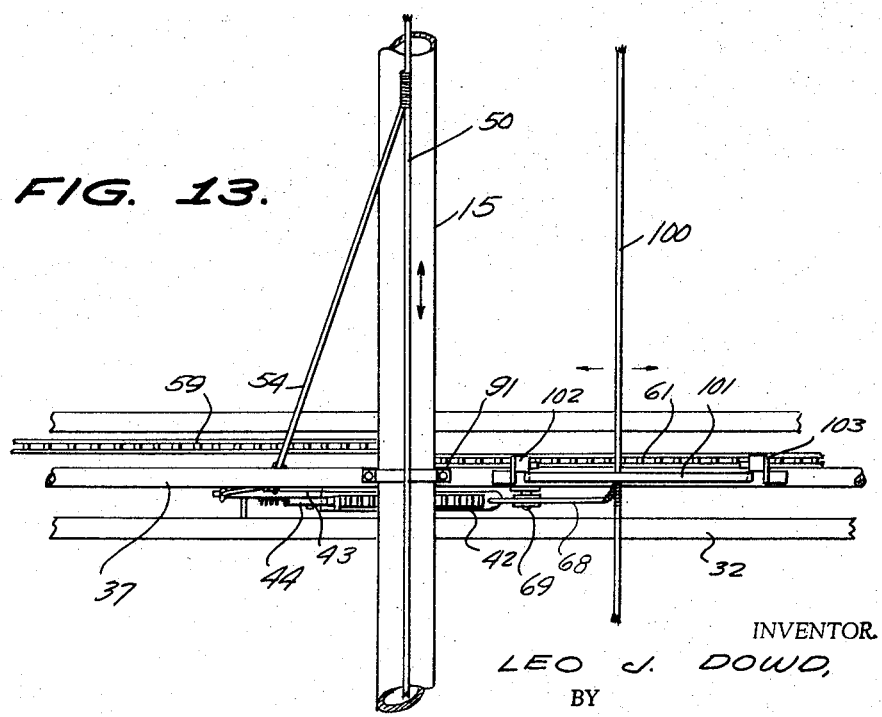

United States Patent Office 3,353,750
Patented Nov. 21, 1967

3,353,750
SELF-PROPELLED IRRIGATION SYSTEM OF THE RECIPROCABLE CABLE TYPE
Leo J. Dowd, 117 South Parkway,
Columbus, Nebr. 68601
Filed Oct. 15, 1965, Ser. No. 496,380
8 Claims. (Cl. 239—177)

ABSTRACT OF THE DISCLOSURE

A self-propelled irrigation apparatus of the type in which a water distributing pipe is revolved about one end as a pivot being carried by an outer mobile support and a plurality of intermediate mobile supports each driven over the ground to be sprayed by an individual ratchet wheel and pawl drive means connected to a flexible member extending longitudinally and parallel to the distributing pipe and reciprocated longitudinally thereof, means suspending the distributing pipe on each intermediate support in pendulum fashion and control means on each intermediate support engaged by the distributing pipe to engage and disengage the drive pawl with the ratchet wheel in accordance with to and fro movements of the distributing pipe.

This invention has to do with a self-propelled irrigation system of the reciprocable cable type.

An object of the present invention is to provide a self-propelled irrigation system wherein a reciprocable flexible member is drivingly-connected to the ratchet wheel drive means on the mobile main support and each of the intermediate mobile supports and causes travel together of said main and intermediate supports in longitudinal alignment over the land to be irrigated and consequent rotation of the water-distributing pipe supported on said supports about a supply conduit as an axis.

Another object of the present invention is to provide a self-propelled irrigation system wherein there is a control means on each of the intermediate mobile supports which is operably-connected to the ratchet wheel of the ratchet wheel drive means on each of the intermediate mobile supports, said control means being operable to activate the ratchet wheel and the attendant drive means of an intermediate mobile support in accordance with lagging behind of and out of longitudinal alignment of said intermediate support with the main and the other intermediate supports, and operable, to de-activate the ratchet wheel and the attendant drive means of said intermediate support in accordance with restoration of said intermediate support to the position of longitudinal alignment with the main support and the other intermediate supports.

A further object of the present invention is to provide a self-propelled irrigation system which is positive in action, easy to maintain in operation, and is commercially practical.

Other objects and advantages of the present invention will become apparent from the following description taken in conjunction with the accompanying drawings, in which:

FIGURE 1 is a perspective view, with parts broken away, of the self-propelled irrigation system according to the present invention.

FIGURE 2 is a fragmentary plan view of the upstanding supply conduit and water-distributing pipe assembly with the reciprocable flexible member connected thereto.

FIGURE 3 is a side elevational view, with parts broken away, of the assembly of FIGURE 2.

FIGURE 4 is a bottom plan view, taken on the line 4—4 of FIGURE 3.

FIGURE 5 is an enlarged transverse elevational view taken on the line 5—5 of FIGURE 1.

FIGURE 6 is a left-hand side elevational view, with parts broken away, of the assembly of FIGURE 5.

FIGURE 7 is a side sectional view, taken on the line 7—7 of FIGURE 5.

FIGURE 12 is a fragmentary elevational view, part in section, of an intermediate mobile support illustrating the water-distributing pipe fixedly-attached to the strut of the A-frame of the mobile support, the reciprocable member above and supported by the distributing pipe, and a modified control mechanism for operating the ratchet wheel drive means of such intermediate support.

FIGURE 13 is a top plan view taken on the line 13—13 of FIGURE 12.

Figure 8:
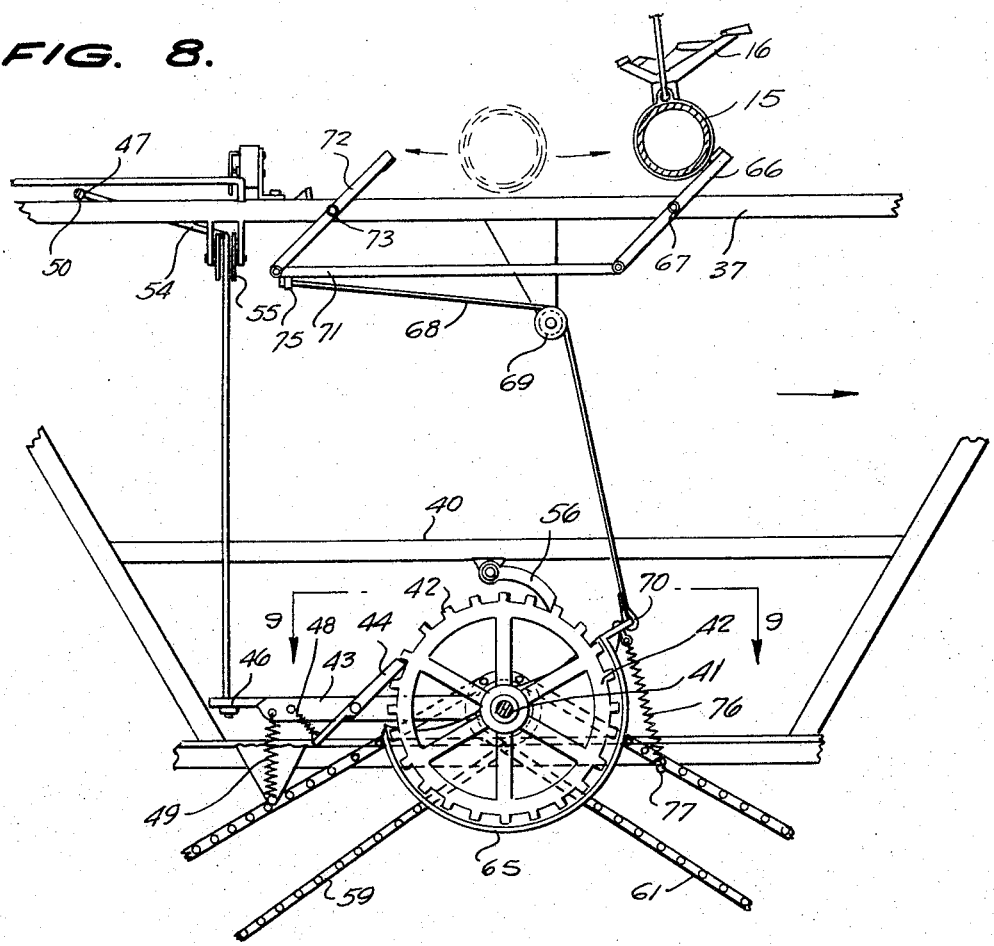
FIGURE 8 is a fragmentary elevational view of the assembly of FIGURE 5 illustrating the water-distributing pipe in bearing engagement with one of the levers for de-activating the ratchet wheel of the ratchet wheel drive means on the intermediate support.
Figure 9:
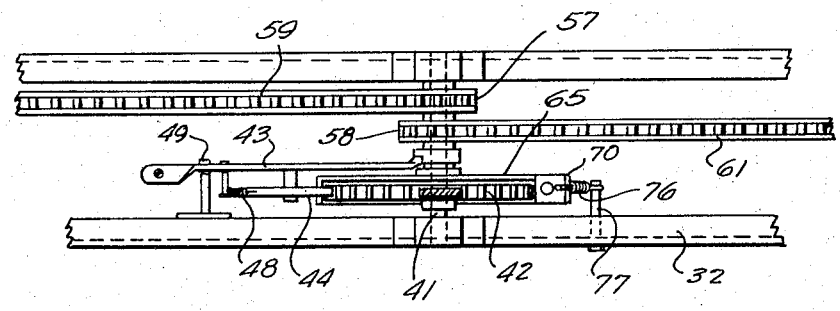
FIGURE 9 is a top plan view taken on the line 9—9 of FIGURE 8.

Referring to FIGURES 1 to 9 of the drawings, the numeral 10 designates, generally, an embodiment of the self-propelled irrigation system according to the present invention. Such system, FIGURE 1, comprises an upstanding water-supply conduit 12 which has its lower end submerged in a well containing water, not shown, the upper end of the conduit 12 being received in one arm of an elbow 13 which is supported in the top or apex of a pyramidal-shaped skeleton frame 14 resting upon the surface of the land above the well, the free end of one arm of the elbow 13 and the upper end of the conduit 12 being connected together by a rotary joint 9. An elongated horizontally-disposed water-distributing pipe 15 has one end fixedly-received in the other arm of the elbow 13. By virtue of the rotary joint 9 the distributing pipe 15 is pivotally-connected to the water-supply conduit 12 for movement of the distributing pipe about the water-supply conduit 12 as an axis. The distributing pipe 15 is made up of a plurality of sections of pipe, the sections being fixedly-connected together in the conventional manner. It is to be noted that the connections of the respective pipe sections are such as to permit limited flexing of the pipe 15. As this forms no part of the invention, no further description appears necessary.

A plurality of discharge nozzles 16 are spaced along the distributing pipe 15 between the ends thereof and serve to spray water onto the land as the distributing pipe 15 moves about the supply conduit 12 as an axis. Inasmuch as the nozzles 16 employed are of the well-known type, and form no part of the invention, further description is deemed unnecessary.

It is to be noted that operatively-associated with the conduit 12 is a pump (not shown) for forcing the water from the well up through the supply conduit 12 and into and out through the pipe 15 to be discharged from the nozzles 16 onto the land underneath.

A main mobile support 20, FIGURE 1, is disposed transversely of the distributing pipe 15 adjacent the other end 18 thereof, and fixedly-carries the distributing pipe 15, the pipe 15 being fixedly-secured to a horizontally-disposed strut 21 extending transversely across and secured to the legs 23 of an upstanding A-frame 22 intermediate the ends thereof. Specifically, the pipe 15 is fixedly-secured to the strut 21 by means of an inverted U-shaped clamp 24.

A plurality of intermediate mobile supports 25 are arranged transversely of and at spaced locations along the distributing pipe 15 between the ends thereof. In FIGURE 1, only one of the supports 25 is shown. However, the number of intermediate supports 25 is variable, and depends upon the total length of the distributing pipe 15. If the total length of the distributing pipe 15 is 1300-feet, then the intermediate supports 25 should be located along the pipe 15 at about 20 or 30-feet spacing therebetween. The spacing of the intermediate supports 25 is optional.

A reciprocal flexible member or cable 50 is disposed on one side of and in parallel spaced relation with respect to the distributing pipe 15, and has one end operatively-connected to a reciprocation imparting means indicated generally by the letter A, FIGURES 2 to 4, carried by the supply pipe 12, and has the other end connected to a coil spring 52, FIGURE 1, on the other end 18 of the distributing pipe 15. Specifically, such means is of the conventional and well-known type and includes an oscillating pitman 51 to which the one end of the reciprocable flexible member 50 is operatively-connected. The pitman 51 is carried by a vertical driven shaft 52' which is drivingly-connected to a gear-reduction mechanism 53. The mechanism 53 is driven by a motor 53'.

On each of the intermediate supports 25 there is a means which suspendingly-supports the adjacent portion of the distributing pipe 15. Since the construction of each intermediate support is the same, only one of such supports will be specifically described. Referring to FIGURES 1 and 5, the support 25 includes an upstanding A-frame 26 which comprises a pair of upstanding legs arranged in converging relation, said legs being indicated by the numerals 27 and 28, respectively, and an elongated strut 37 extends transversely across and is secured to the legs 27 and 28 intermediate the ends thereof, the strut having one end portion 35 projecting outwardly of the leg 27 and having the other end portion 36 projecting outwardly of the leg 28. A pendulum 30 is disposed within the A-frame 26 and has the upper end pivotally-supported from the apex of the frame or the convergent ends of the legs 27 and 28, as at 31, the lower end of the pendulum 30 being pivotally-connected to the adjacent portion of the distributing pipe 15, as by being secured to an eye 33, as shown in FIGURE 5.

The A-frame 26 has the lower end of each of its legs 27 and 28 carrying a longitudinal support bar 29, the support bars 29 being connected together by a base leg 32. Each support bar 29 has depending therefrom a wheel yoke 30' in which is journaled a cleated ground-engaging wheel 31'. Braces 38 and 39 extend from the legs 27 and 28 to the base leg 32, and are secured to the legs 27 and 28 of the base leg 32, respectively. A bracket 40 extends from the brace 38 to the brace 39 and is fixedly-attached to the braces 38 and 39.

The lower end of each of the legs 23 of the A-frame 22 of the main mobile support 20, FIGURE 1, also carries a longitudinal support bar 29, the support bars 29 being connected together by a base leg 32. Each support bar 29 has depending therefrom a wheel yoke 30' in which is journaled a cleated ground-engaging wheel 31'. The frame 22 also has the braces 38 and 39 which extend from and are secured to the legs 23 and to the base leg 32, with a bracket 40 extending from and fixedly-attached to the brace 38 and the brace 39.

A guy cable construction is provided for connecting the A-frame 22 of the main mobile support 20 and the A-frames 26 of the intermediate supports 25 together and holding the respective supports in alignment. Such construction comprises a cable 80 having its mid-point stretched over and attached to the apex of the A-frame 22 of the main mobile support 20 and over that of each of the A-frames 26 of the intermediate mobile supports 25 with its ends fixedly-attached to the water-distributing pipe 15 as at 81 and 82, FIGURE 1, and a shorter cable 83 having its mid-point stretched over and attached to the apex of the A-frame 22 of the main mobile support 20 and over that of each of the A-frames 26 of the intermediate supports 25, with its ends fixedly-attached to the water-distributing pipe 15, as at 84 and 85.

An elongated flexible member or cable 90, FIGURE 1, serving as a guy, is disposed on one side of and extends in parallel spaced relation along the distributing pipe 15, the intermediate portion being supported in the end portions 35 of the strut 37 of the frame 26 of each intermediate support 25, and the complemental end of the strut 21 of the frame 22 of the main support 20, with one end, FIGURE 2, secured to a collar 91 on the distributing pipe 15 adjacent the skeleton frame 14, and the other end attached to the other end 18 of the distributing pipe 15, as at 92, as shown in FIGURE 1. Another elongated flexible member or cable 93 serves as a guy and is disposed on the opposite side of and extends in parallel spaced relation along the distributing pipe 15, the intermediate portion being supported on the end portion 36 of the strut 37 of the frame 26 of each intermediate support 25 and the complemental end of the strut 21 of the frame 22 of the main support 20, with one end, FIGURE 2, secured to the collar 91 on the distributing pipe 15 adjacent the skeleton frame 14, and the other end attached to the other end 18 of the distributing pipe, as at 92, as shown in FIGURE 1.

The A-frame 22 of the main mobile support 20 and the A-frame 26 of each of the intermediate mobile supports 25 has thereon a ratchet wheel drive means, such means on all of the supports 20 and 25 being identical in construction. In order to distinguish the means on the main support 20 from the means on each of the intermediate supports 25 the means on the main support 20 will be designated hereinafter as a main ratchet wheel drive means, and the means on each of the intermediate supports 25 will be designated hereinafter as the subsidiary ratchet wheel drive means. Because of the sameness of construction, the following specific description of such means will be applicable to both the main and subsidiary ratchet wheel drive means. Specifically, said drive means comprises a horizontal drive shaft 41 which is disposed transversely of and is supported on the mid-portion of the base leg 32, the shaft 41 carrying a ratchet wheel 42. An arm 43 is rotatably-supported upon the shaft 41, and carried by the arm 43 is a pawl 44 which is normally in driving engagement with the ratchet wheel 42. The arm 43 is operatively-connected to the reciprocable flexible member 50 for movement with the latter as by means of a subsidiary cable 54, the cable 54 being trained over a pulley 55 carried by the strut 21 of the A-frame 22 of the main support 20 or a pulley 55 carried by the strut 37 of the A-frame 26 of an intermediate support 25, and having one end secured to the free end of the arm 43, as at 46, and having the other end connected to the reciprocable flexible member 50 for movement with the latter, as at 47. A coil spring 48 operatively-connects the pawl 44 to the arm 43, and serves to bias the pawl 44 into driving engagement with the ratchet wheel 42. Another coil spring 49 operatively-connects the arm 43 to the base leg 32 and serves to bias the arm toward operative position. A locking dog 56 which is pivotally-supported on the bracket 40 is in meshing engagement with the ratchet wheel 42. Carried by the drive shaft 41 are a pair of sprockets 57 and 58 which are arranged in side-by-side spaced relation on the shaft 41. The sprocket 57 is drivingly-connected to one of the wheels 31' by means of a sprocket chain 59 trained over the sprocket 57 and a sprocket 60 on the one wheel 31', and the sprocket 58 is drivingly-connected to the other of the wheels 31' by means of a sprocket chain 61 trained over the sprocket 58 and a sprocket 62 on the other wheel 31'.

It is to be noted that the main mobile support 20 is constantly driven by the flexible member 50, and by virtue of it being so driven, effects the rotation of the distributing pipe 15 about the supply conduit 12 as an axis, the intermediate mobile supports 25, with their ratchet wheel drive means de-activated, traveling along with and in longitudinal alignment with the main support 20. Should one or more of the intermediate supports 25 lag behind and become out of longitudinal alignment with the main support 20, and the other of the intermediate supports 25, the ratchet wheel drive means of said lagging support or supports 25 is activated, and thereby positively driven, this driving being continued until the said lagging support or supports 25 have been restored to position of longitudinal alignment with the main support 20 and the other supports 25, whereupon the ratchet wheel drive means of said restored intermediate support or supports are de-activated.

On each of the intermediate supports 25 only there is provided a control means which is operatively-connected to the ratchet wheel of each subsidiary ratchet wheel drive means, said control means being operable to activate the ratchet wheel and the attendant drive means of an intermediate mobile support in accordance with lagging behind of and out of longitudinal alignment of said intermediate support with the main mobile support and the other intermediate supports, and being operable to de-activate the ratchet wheel and the attendant drive means of said intermediate support in accordance with restoration of said intermediate support to the position of longitudinal alignment with the main mobile support and the other intermediate supports. Said control means, FIGURES 5, 6, 7 and 8, includes an arcuate shield 65 which is rockably-mounted on the drive means of the ratchet wheel drive means of said intermediate support 25, the shield being operable to activate the ratchet wheel and the attendant drive means of said intermediate support in accordance with lagging behind of and out of longitudinal alignment of said intermediate support with the main support 20 and the other intermediate supports 25, and operable to de-activate the ratchet wheel and the attendant drive means of said intermediate support in accordance with restoration of said intermediate support to the position of longitudinal alignment with the main support and the other intermediate supports. Specifically, the shield 65 is disposed so as to encompass and cover the adjacent portion of the teeth of the sprocket wheel 42 and is connected to shaft 41 for rocking movement about said shaft as an axis. The shield 65 is operatively-connected to an upstanding lever 66 which is disposed within the frame 26 of an intermediate support 25 and on one side of and spaced from the distributing pipe 15. The lever 66 is connected to the frame 26 or strut 37 for pivotal movement about a horizontal axis or pin 67 between the upstanding position and a position sloping to one side of the axis or pin 67. A like lever 72 is also disposed within the frame 26 and on the opposite side of and spaced from the distributing pipe 15, the lever 72 being also connected to the frame 26 or strut 37 for pivotal movement about a horizontal axis or pin 73 between the upstanding position and a position sloping to one side of the axis or pin 73. A connecting bar 71 connects the lower ends of the levers 66 and 72 together for simultaneous movement. A cord 68 has one end secured to the shield 65, as at 70, the cord being trained about a pulley 69 dependingly-carried by the strut 37 of the frame 26 and having the other end secured to the connecting bar 71, as at 75. A coil spring 76 has one end attached to the said one end of the shield 65, and has the other end attached to a bolt 77 carried by the base leg 32 of the frame 26, the spring 76 serving to bias the other end of the shield 65 into bearing contact with the pawl 44 to thereby hold the ratchet out of meshing engagement with the ratchet wheel 42.

In operation, whenever an intermediate support 25 lags behind or is out of longitudinal alignment with the main support 20, and the other intermediate supports 25, the distributing pipe 15 shifts from the position indicated in FIGURE 5 to the position shown in FIGURE 8 wherein it bears against the lever 66 and activates the subsidiary ratchet wheel drive means of the intermediate support 25 by causing the lever 66 to move to the position sloping to one side of the axis or pin 67, and consequent rotation of the shield 65 against the action of the spring 76 to an extent such as to withdraw the shield from supporting contact with the pawl 44 and permit the pawl 44 to drop into meshing engagement with ratchet wheel 42 and drive the shaft 41 and the ground-engaging wheels 31' of the intermediate support 25. With the restoration of the intermediate support 25 to the position in longitudinal alignment with the main support 20, and the other of the intermediate supports 25, the subsidiary ratchet wheel drive means of said support is de-activated by shifting of the distributing pipe 15 to its position of FIGURE 5, resulting in the return of the levers 66 to the upstanding position and consequent reverse rotation of the shield 65 under the action of the spring 76 to an extent to shift the shield 65 into supporting contact with the pawl 44 and hold the the pawl 44 out of meshing engagement with the ratchet wheel 42 and arrest the driving of the shaft 41 and the ground-engaging wheels 31' of the intermediate support 25.

Figure 10:
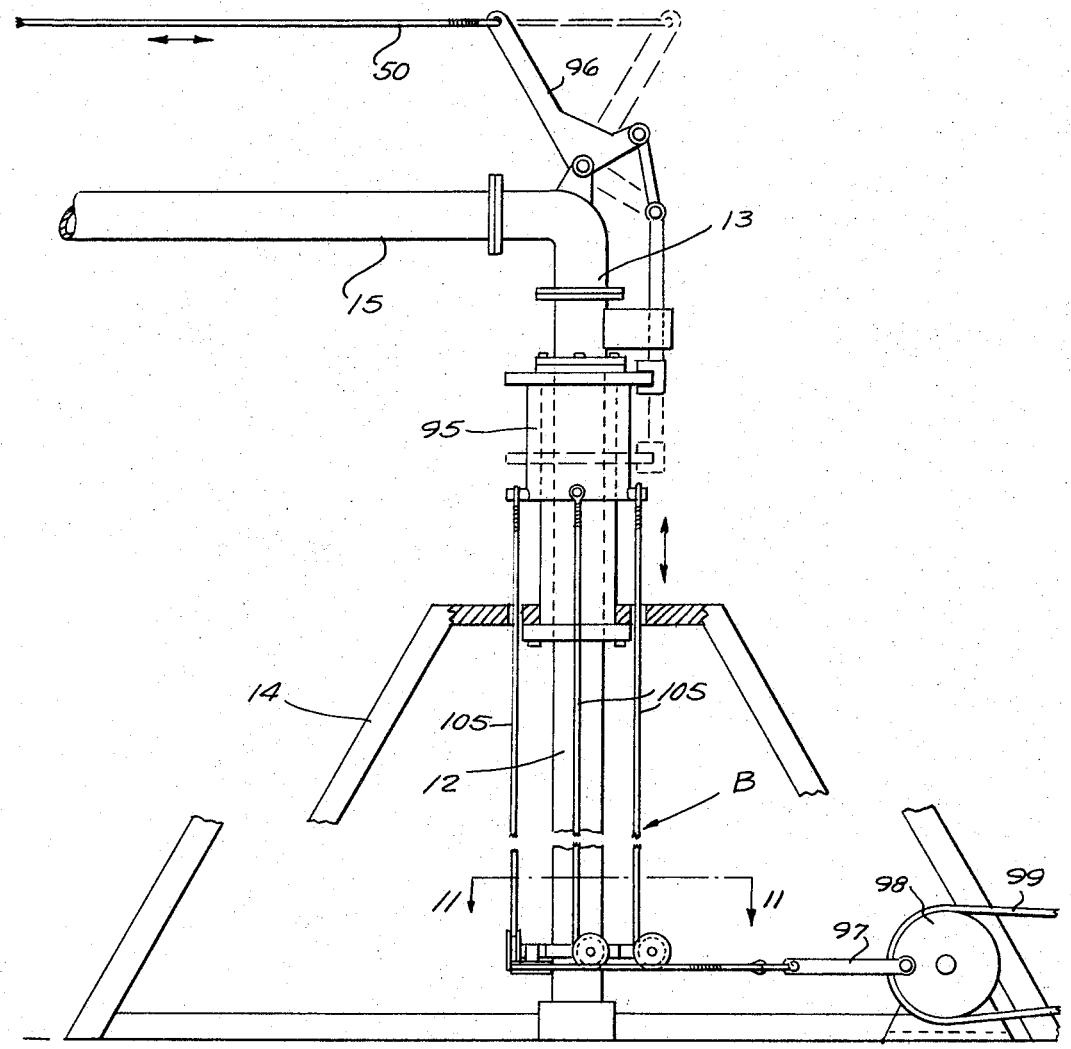
FIGURE 10 is a fragmentary elevational view illustrating the reciprocable flexible member disposed over and above the water-distributing pipe and connected to a bell crank lever pivotally-carried by the upstanding supply conduit with a reciprocating imparting means operatively-connected to the crank lever.
Figure 11:
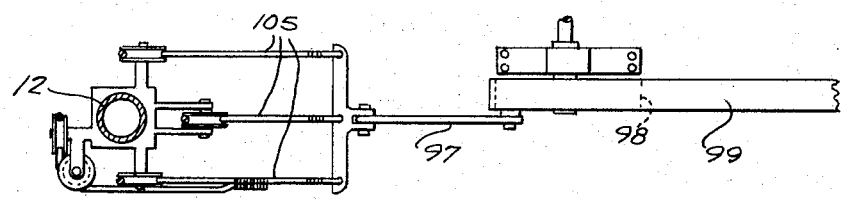
FIGURE 11 is a sectional view taken on the line 11—11 of FIGURE 10.

If desired, the system above-described may be modified by omitting the pendulum 30 on the frame 26 of each of the intermediate supports 25 and fixedly-securing the adjacent portion of the distributing pipe 15, as shown in FIGURES 12 and 13, to the strut 37 of the frame 26 by means of a saddle 98 rising from the strut 37; arranging the reciprocable flexible member 50 so that said member 50 is spaced above and extends along the distributing pipe 15 in parallel spaced relation with respect thereto and is supported by the pipe 15, as also shown in FIGURES 12 and 13, and having one end connected to a bell crank lever 96 pivotally-carried by the elbow 13 of the supply conduit 12, FIGURE 10, and having the other end connected, FIGURE 1, to the other end 18 of the distributing pipe 15, as at 92, with a different reciprocating imparting means designated by the letter B operatively-connected to the bell crank lever 96; and replacing the connecting bar 71 and levers 66 and 72, of the control means, as illustrated in FIGURE 5, by an auxiliary flexible member or cable 100, FIGURE 12, which is disposed in parallel spaced relation with respect to the reciprocable flexible member 50 and which extends from the supply pipe 12 through the intermediate supports 25 and to the main mobile support 20 and which is slidable within and along a guideway 101 provided on the strut 37 of the frame 26 of each intermediate support 25 between spaced contact switches 102 and 103, and which is operatively-connected to the shield 65 as by the free end 95 of the cable 68 being operatively-connected to the auxiliary member or cable 100, as clearly shown in FIGURE 12.

The reciprocating imparting means indicated by the letter B, FIGURE 10, is a conventional means and comprises a reciprocable collar 95 which is operatively-connected to a reciprocating pitman 97 carried by rotatable pulley 98 which is operatively-connected to a power source, not shown, by means of a belt 97, the pitman 97 being connected to the collar 95 by means of a series of reciprocating cables 105 surrounding the upstanding conduit 12 and connected to the lower end of the collar 95.

In operation of the control means of FIGURES 12 and 13, whenever an intermediate support 25 lags behind and is out of longitudinal alignment with the main support 20 and the other intermediate supports 25, the cable 100 contacts either of the switches 102 or 103, depending upon whether the lagging is by falling behind or being forwardly of the longitudinal alignment of the main support and the other intermediate supports, and thereby cuts out or stops the power source driving the reciprocating cable 50 which is mounted on the skeleton frame 14, not shown, and stopping the entire system. The repairs are then made at the point of trouble, whereupon the intermediate support 25 which is out of alignment is shifted manually into alignment or into longitudinal alignment with the main support and the other intermediate supports causing the cable 100 to move out of contact with either of the switches 102 or 103 and to activate the ratchet wheel drive mechanism of the main support 20.

What is claimed is:

1. A self-propelled irrigation system comprising an upstanding water-supply conduit, an elongated horizontally-disposed water-distributing pipe having one end pivotally-connected to said supply conduit for movement of said distributing pipe about said supply conduit as an axis, a main mobile support disposed transversely of said distributing pipe adjacent the other end thereof and fixedly-carrying said distributing pipe, a plurality of discharge nozzles spaced along said distributing pipe between the ends thereof for spraying water onto the land as said distributing pipe moves about said supply conduit as an axis, a plurality of intermediate mobile supports arranged transversely of and at spaced locations along said distributing pipe between said main support and said one end of said pipe, means on each intermediate support for supporting the adjacent portion of said distributing pipe, a main ratchet wheel drive means on said main support, a subsidiary ratchet wheel drive means on each of said intermediate supports, a flexible member disposed on one side of and in spaced relation with respect to said distributing pipe and having one end operatively-connected to said supply conduit and having the other end operatively-connected to the other end of said distributing pipe means for longitudinally reciprocating said flexible member in a path parallel to said distributing pipe, means drivingly-connecting each of said main and said subsidiary ratchet wheel drive means to said reciprocable flexible member including a ratchet wheel drive pawl, and a control means operatively-connected to the drive pawl of each subsidiary ratchet wheel drive means and operable to activate the ratchet wheel and the attendant drive means of an intermediate support in accordance with lagging of and out of longitudinal alignment of said intermediate support with the main support and the other intermediate supports, and operable to de-activate the drive pawl and the attendant drive means of said intermediate support in accordance with restoration of said intermediate support to the position of longitudinal alignment with the main support and the other intermediate supports.

2. The system according to claim 1, wherein said means on each intermediate support for supporting the adjacent portion of said distributing pipe is a suspension means for carrying the pipe in pendulum fashion, and wherein a portion of said conrtol means of an intermediate support is movable into bearing contact with the adjacent portion of said distributing pipe in accordance with lagging behind of and out of longitudinal alignment of said intermediate support with the main support and the other intermediate supports to activate the drive pawl and the attendant drive means to said intermediate support, and said portion of said control means is movable out of bearing contact with the adjacent portion of said distributing pipe in accordance with restoration of said intermediate support to the position of longitudinal alignment with the main support and the other intermediate supports to de-activate the drive pawl and the attendant drive means of said intermediate support.

3. The system according to claim 1, wherein said means on each intermediate support for supporting the adjacent portion of said distributing pipe fixedly mounts the pipe on the intermediate support, and wherein a second and auxiliary flexible member is disposed in parallel spaced relation with respect to said first reciprocable flexible member and extends from said supply conduit to said main support; said control means of an intermediate support including a pair of parts spaced on each side of said second flexible member, each of said parts being actuable on contact with said second flexible member to stop said means for reciprocating said first flexible member, whereby lagging and leading movements out of longitudinal alignment of said intermediate support will operate to stop reciprocation of said first flexible member and de-activate the drive pawl and the attendant drive means of said intermediate support.

4. The system according to claim 1, wherein said control means includes an arcuate shield rockably-mounted on the drive means of the ratchet wheel drive means of each of said intermediate supports, said shield being operable to activate the ratchet wheel and the attendant drive means of an intermediate support in accordance with lagging of and out of longitudinal alignment of said intermediate support with the main support and the other intermediate supports, and operable to de-activate the ratchet wheel and the attendant drive means of said intermediate support in accordance with restoration of said intermediate support to the position of longitudinal alignment with the main support and the other intermediate supports.

5. The system according to claim 4, wherein the means on each intermediate support for supporting the distribution pipe comprises an upstanding frame rising from said support and a pendulum within and having the upper end pivotally and suspendingly-supported from said frame and having the lower end pivotally-connected to the adjacent portion of the distributing pipe; and wherein said control means also includes an upstanding lever disposed within the frame of each intermediate support and on one side of and spaced from said distributing pipe and connected to the frame for pivotal movement about a horizontal axis between the upstanding position and a position sloping to one side of the axis, and means connecting said shield to said lever for movement with said lever, said lever being in bearing contact with said distributing pipe and said shield being out of contact with the drive pawl of the subsidiary ratchet wheel drive means upon execution of the movement of said lever to the position sloping from one side of the axis in accordance with lagging behind and out of longitudinal alignment of said intermediate support with the main support and the other supports to activate the ratchet wheel and the attendant drive means of said intermediate support, and said lever being out of bearing contact with said distributing pipe and said shield being in bearing contact with the drive pawl of the subsidiary ratchet wheel drive means upon execution of the movement of said lever to the upstanding position in accordance with the restoration of said intermediate support to the position of longitudinal alignment with the main support and the other intermediate supports to de-activate the ratchet wheel and the attendant drive means of said intermediate support.

6. The system according to claim 5, wherein said reciprocable flexible member has one end operatively-connected to an oscillating pitman carried by said supply conduit and having the other end connected to a coil spring on the other end of said distributing pipe.

7. The system according to claim 4, wherein the means on each intermediate support for supporting the distribution pipe comprises an upstanding frame rising from said support, and a crossbar on said frame, the adjacent portion of said distributing pipe being fixedly-attached to said crossbar; and wherein a second and auxiliary flexible member is disposed in parallel spaced relation with respect to said first reciprocable flexible member and extends from said supply conduit to said main support said control means of an intermediate support including a pair of parts spaced on each side of said second flexible member, each of said parts being actuable on contact with said second flexible member to stop said means for reciprocating said first flexible member, said shield of an intermediate support being so connected to said second flexible member as to move out of bearing contact with the drive pawl and thereby engage the pawl with the ratchet wheel of the ratchet wheel wheel drive means of said intermediate support upon movement of said auxiliary flexible member away from and out of parallelism with respect to said reciprocable flexible member in accordance with lagging of and out of longitudinal alignment of said intermediate support with the main support and the other intermediate supports to activate the ratchet wheel and the attendant drive means of said intermediate support, and said shield being so connected to said second flexible member as to move into bearing contact with the drive pawl to disengage the pawl from the ratchet wheel drive means of said intermediate support upon movement of said auxiliary meuber toward and in parallelism with respect to said reciprocable member in accordance with the restoration of said intermediate support to the position of longitudinal alignment with the main support and the other intermediate supports to de-activate the ratchet wheel and the attendant drive means of said intermediate support.

8. The system according to claim 7, wherein said means for reciprocating said first flexible member comprises an oscillating lever carried by said distributing pipe and having one end operatively-connected to the first member, and a reciprocating imparting means operatively-connected to said lever.

References Cited
UNITED STATES PATENTS

| | | | |
|---|---|---|---|
| 863,782 | 8/1907 | Callan | 74—148 X |
| 2,604,359 | 7/1952 | Zybach | 239—177 |
| 2,893,643 | 7/1959 | Gordon | 239—177 X |
| 2,941,727 | 6/1960 | Zybach | 239—177 |
| 3,220,654 | 11/1965 | Purtell | 239—212 |
| 3,268,174 | 8/1966 | Boone | 239—212 |
| 3,302,656 | 2/1967 | Boone | 239—177 X |
| 3,314,608 | 4/1967 | Curtis et al. | 239—212 X |

ROBERT B. REEVES, *Primary Examiner.*

M. HENSON WOOD, JR., *Examiner.*

V. C. WILKS, *Assistant Examiner.*